D. BURKET.
INSECT EXTERMINATING ATTACHMENT FOR CULTIVATORS.
APPLICATION FILED JUNE 12, 1915.
1,172,935. Patented Feb. 22, 1916.
2 SHEETS—SHEET 1.
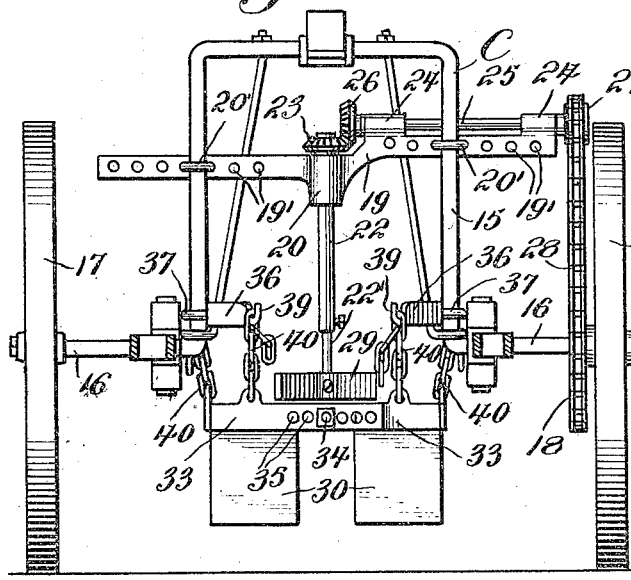
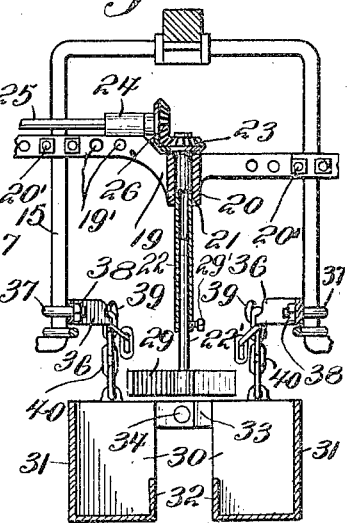
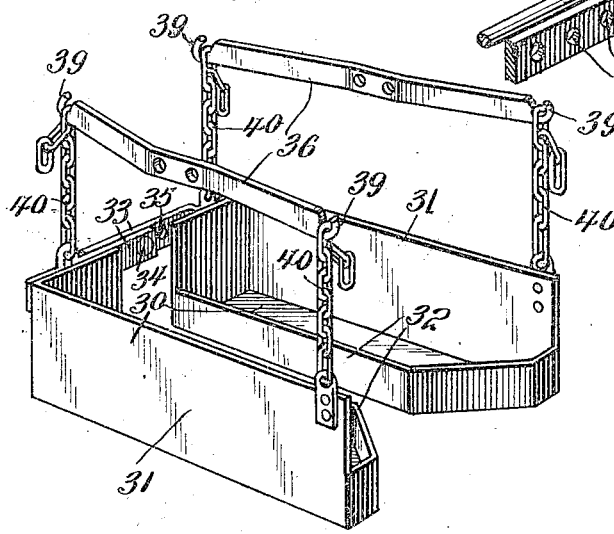
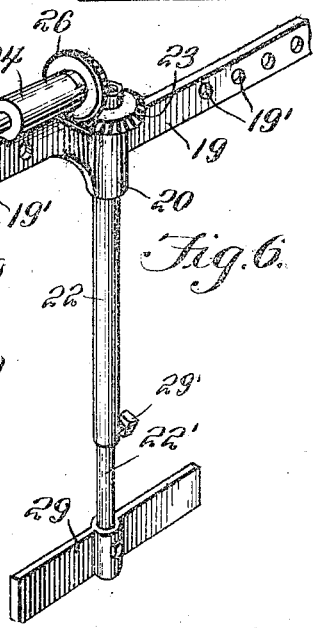
Inventor
D. Burket
By Victor J. Evans
Attorney
Witnesses

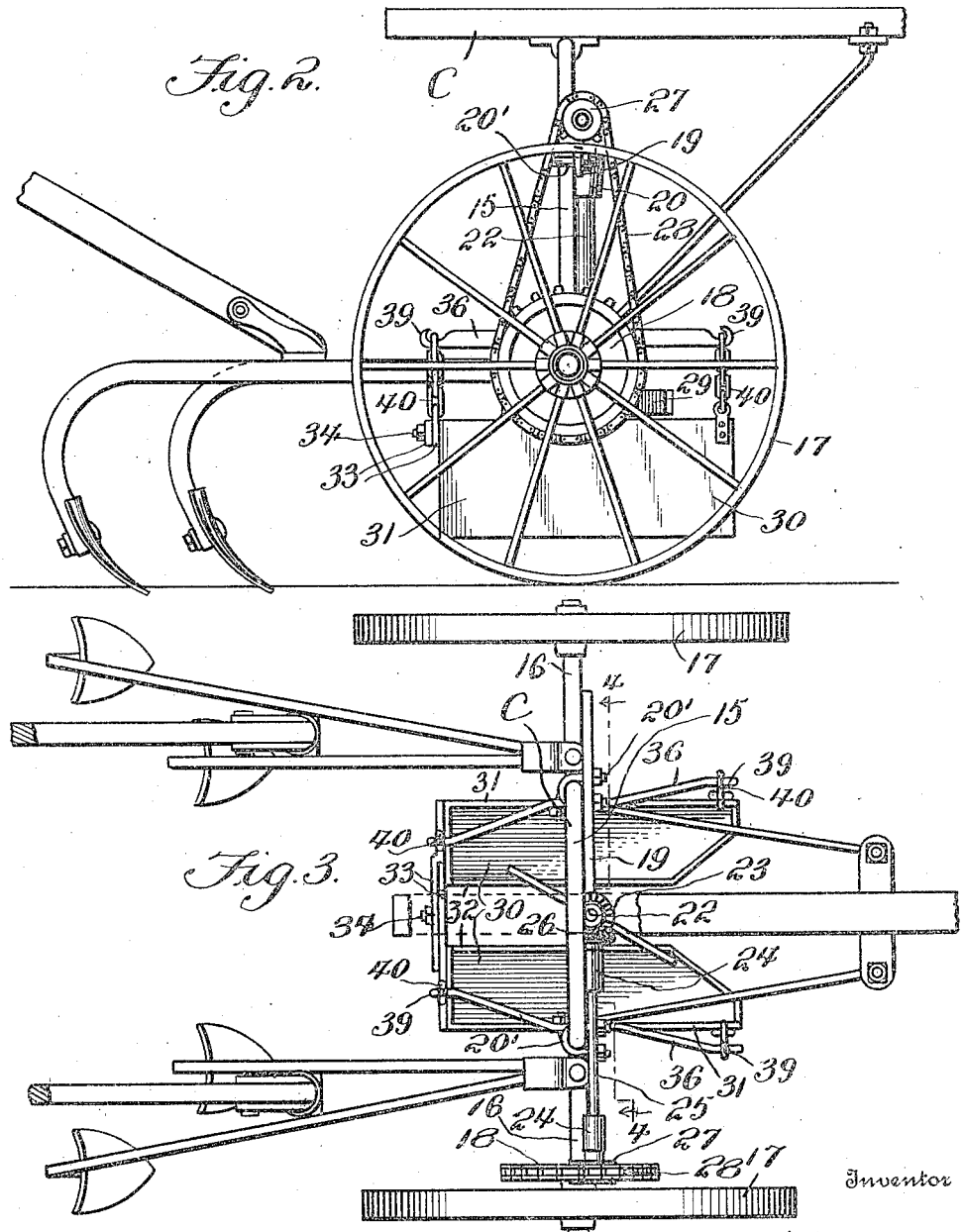

UNITED STATES PATENT OFFICE.

DELMER BURKET, OF SOUTH BEND, INDIANA.

INSECT-EXTERMINATING ATTACHMENT FOR CULTIVATORS.

1,172,935.  Specification of Letters Patent.  Patented Feb. 22, 1916.

Application filed June 12, 1915. Serial No. 33,751.

*To all whom it may concern:*

Be it known that I, DELMER BURKET, a citizen of the United States, residing at South Bend, in the county of St. Joseph and State of Indiana, have invented new and useful Improvements in Insect-Exterminating Attachments for Cultivators, of which the following is a specification.

This invention relates to devices for exterminating insect pests and particularly potato bugs, and it has for its object to produce a device of very simple and inexpensive construction which may be readily applied to and used in connection with an ordinary walking cultivator, thus enabling a row of plants to be cultivated and the bugs to be removed therefrom at a single operation.

A further object of the invention is to produce a rotary beater or agitator and means for driving the same which may be readily applied to the arched axle of an ordinary cultivator to receive motion from one of the ground wheels.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a rear elevation of a cultivator to which the invention has been applied. Fig. 2 is a side elevation of the same. Fig. 3 is a top plan view. Fig. 4 is a vertical transverse section taken on the line 4—4 in Fig. 3. Fig. 5 is a perspective view showing the receiving pans and the supporting means for the same detached. Fig. 6 is a perspective view showing the beater and related parts detached.

Corresponding parts in the several figures are denoted by like characters of reference.

The invention is applicable to an ordinary walking cultivator, a conventional type of which may be seen at C, 15 representing the axle arch, 16 the spindles, and 17 the ground wheels, one of which has a sprocket wheel 18 suitably connected therewith.

The improved attachment comprises a frame bar or member 19 having apertures 19' for the reception of clips 20', whereby it may be adjustably mounted on the axle arch 15, said frame bar being adapted to be mounted on arches of different widths. The bar 19 is provided about midway between its ends with an enlargement 20 having a vertical bore 21 constituting a box or bearing for a vertical tubular shaft 22 which is provided at its upper end with a bevel gear 23. The frame bar 19 is provided with additional boxes 24 affording bearings for a horizontal shaft 25 having a bevel gear 26 meshing with the bevel gear 23. The shaft 25 is also provided with a sprocket wheel 27 which is connected by a chain 28 with the sprocket wheel 18. The tubular shaft 22 has a telescopic extension member 22' carrying at its lower end a beater 29. Said extension member may be secured at various adjustments by means of a set screw 29', thus enabling the beater to be raised or lowered, as may be desired.

For the purpose of receiving the bugs a pair of pans 30 are provided, said pans having high outer walls 31 and relatively low inner walls 32, said pans being connected together at their rear ends by overlapping arms 33 which are adjustably connected together by a bolt 34 for the passage of which each of the arms 33 is provided with a plurality of apertures 35. Angular supporting bars or yokes 36 are secured in the angles between the limbs of the axle arch 15 and the spindles 16, said yokes being preferably mounted detachably by means, such as clips 37 and bolts 38. Each yoke 36 is provided at the ends thereof with hooks 39 which are connected by flexible elements, such as short chains 40, with the pans 30 which are thus suspended in position for operation. By using chains as suspending members, the pans may obviously be supported in various positions, it being usually desirable to hang said pans as low as possible.

From the foregoing description, taken in connection with the drawings hereto annexed, the operation and advantages of this invention will be readily understood.

It will be seen that the improved device is capable of being very quickly and easily mounted on an ordinary walking cultivator, and that when the latter is drawn over the field, rotary movement will be transmitted from one of the ground wheels to the beater which is supported for operation above the pans which straddle the row of plants that is to be operated on. As the machine advances the vines will be beaten and agitated, causing the bugs to drop into the pans from which they will be removed from time to time.

When desired, insect destroying liquid, such as crude oil, may be placed in the pans, but this is not deemed necessary or essential.

It will be seen that by applying this device to a cultivator, the plants may be cultivated and the bugs removed therefrom at a single operation.

Having thus described the invention, what is claimed as new, is:—

A bug gathering attachment for cultivators, the same comprising a frame bar, a horizontal shaft and a vertically adjustable vertical shaft supported for rotation on said frame bar, said shafts having intermeshing bevel gears, a beater carried by the vertical shaft, angular yokes secured in the angles between the spindles and the limbs of the axle arch of the cultivator, said yokes having terminal hooks, receiving pans adjustably suspended from said hooks, means for mounting the frame bar on the axle arch of the cultivator, and means for transmitting motion from a ground wheel of the cultivator to the horizontal shaft.

In testimony whereof I affix my signature in presence of two witnesses.

DELMER BURKET.

Witnesses:
DWIGHT L. BURKETT,
ALLEN BURKET.